United States Patent [19]
Sato

[11] 4,394,035
[45] Jul. 19, 1983

[54] AUTOMOTIVE VEHICLE SEAT BELT DEVICE

[75] Inventor: Yoshimi Sato, Yokohama, Japan

[73] Assignee: Nissan Motor Co., Ltd., Yokohama, Japan

[21] Appl. No.: 187,870

[22] Filed: Sep. 17, 1980

[30] Foreign Application Priority Data

Sep. 19, 1979 [JP] Japan .................................. 54-119210

[51] Int. Cl.³ ............................................. A62B 35/00
[52] U.S. Cl. ................................................... 280/804
[58] Field of Search ................ 280/804, 805, 806, 807

[56] References Cited

U.S. PATENT DOCUMENTS 3,777,840 11/1973 Botnik et al. ...................... 180/82 C
4,180,283 12/1979 Ziv ...................................... 280/802
4,225,155 9/1980 Seiffert et al. ....................... 280/804

FOREIGN PATENT DOCUMENTS 2173973 10/1973 France .
1371134 10/1974 United Kingdom ................ 280/804
1385046 2/1975 United Kingdom ................ 280/804
1389318 4/1975 United Kingdom ................ 280/804
1404867 9/1975 United Kingdom ................ 280/804
1407612 9/1975 United Kingdom .
1407984 10/1975 United Kingdom ................ 280/804
1416592 12/1975 United Kingdom ................ 280/804

Primary Examiner—Richard A. Bertsch
Attorney, Agent, or Firm—Thompson, Birch, Gauthier & Samuels

[57] ABSTRACT

An automotive vehicle seat belt is attached to a slide mechanism attached to the vehicle body or door adjacent the occupant seat. The belt is connected to a slide element which slides on a rail between a forward released position (door open) and a rearward retaining position (door closed) in response to a door switch. A control mechanism overrides the effect of the door switch under certain conditions so that the belt does not release automatically when the door is opened. Examples of such conditions include specified criteria, ignition switch, transmission shift position, clutch position, and hand brake position.

14 Claims, 8 Drawing Figures

AUTOMOTIVE VEHICLE SEAT BELT DEVICE

BACKGROUND OF THE INVENTION

The present invention relates to an automotive vehicle seat belt device which retains an occupant against a seat during driving.

In a conventional seat belt device, an occupant manually locks a buckle of a seat belt when he sits in the vehicle seat to retain his body against the seat, and manually releases the buckle before getting out of the vehicle. This conventional device is of a mechanical type which is manually operated in all respects.

The present invention contemplates a seat belt device in which the seat belt is automatically electrically released and tightened.

SUMMARY OF THE INVENTION

The automotive vehicle seat belt device of the present invention comprises a slide element slidable in a slide rail and connected to one end of a seat belt. The other end of the seat belt is anchored to the vehicle body or frame. The slide element is driven by a drive motor usually operative in response to the opening and closing of the vehicle door adjacent the particular seat belt device. A front travel limit switch and a rear travel limit switch detect predetermined positions of the slide element in the slide rail to disable the motor.

The automotive vehicle seat belt device further includes a control switch which operates in response to predetermined vehicle conditions to disable the effect of the door switch.

BRIEF DESCRIPTION OF THE DRAWINGS

The features and advantages of the automotive vehicle seat belt device of the present invention will be more clearly appreciated from the following description taken in conjunction with the accompanying drawings in which like reference numerals designate corresponding elements and in which.

DESCRIPTION OF THE PREFERRED EMBODIMENT

Figure 1:
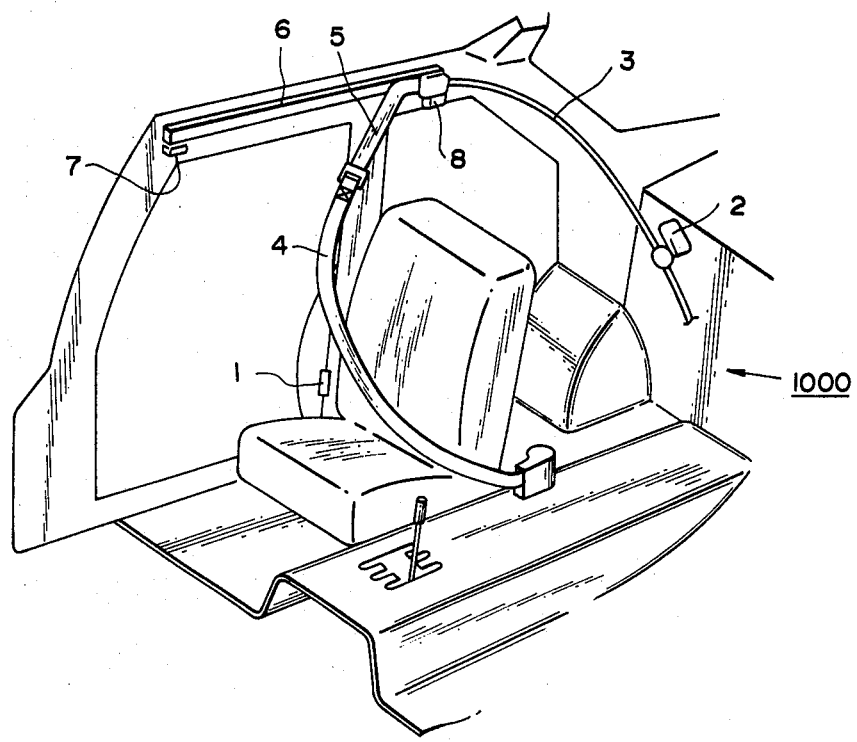
FIG. 1 is a perspective view of the automotive vehicle seat belt device according to the present invention mounted inside the vehicle compartment.

Turning now to the drawings, and more specifically to FIG. 1, the automotive vehicle seat belt device of the present invention is shown generally illustrated by the numeral 1000. The seat belt device includes a door switch 1 which detects the opening of the door to drive an electric motor 2 which, in turn, actuates a drive wire 3 to move a slide element 5 forward or backward along a slide rail 6 fixed to a door or the roof of the vehicle. A retaining strap or seat belt 4 is connected at one end thereof to the slide element and is anchored at the other end thereof to the vehicle body or frame. A front travel limit switch 7 and a rear travel limit switch 8 are provided at opposite ends of the rail 6 to detect the forward and backward movement of the slide element 5 in order to control the forward and backward movement of the seat belt.

Figure 2:
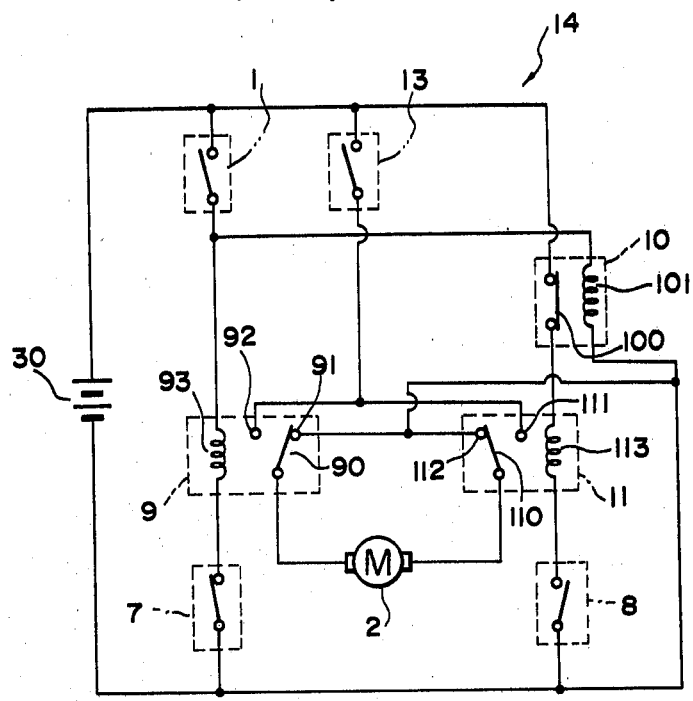
FIG. 2 is a schematic diagram of a first embodiment of the electric motor drive circuit of the seat belt device according to the present invention.
Figure 3:
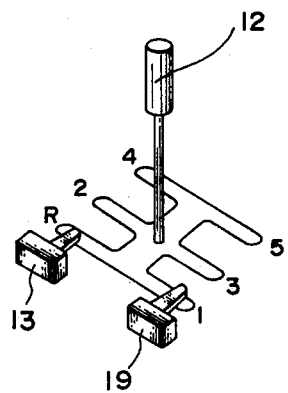
FIG. 3 is a perspective view of the transmission shift lever and two switches provided near the shift lever for detecting whether the transmission shift lever is in the reverse or forward position.

Referring to FIG. 2, there is shown a first embodiment of a drive circuit for the motor 2, generally designated by the reference numeral 14. The door switch 1 is closed when the door is open, and is open when the door is closed. A first changeover means, such as a relay 9, has a moving contact 90 which is switched from a first fixed contact 91 to a second fixed contact 92 when fed with electric current through a magnetic coil 93 from a power supply 30, and which returns to contact the first fixed contact 91 when the coil 93 is de-energized. The front travel limit switch 7 is opened when engaged by the slide element 5, and closed when disengaged by the slide element. In the same manner, the rear travel limit switch 8 is opened when engaged by the slide element 5, and closed when disengaged from the slide element. A relay 10 has a normally closed contact 100 which is opened when the magnetic coil 101 is fed with electric current, and which is closed when the coil 101 is de-energized. A second changeover means, such as a relay 11, includes a moving contact 110 which is switched from a first fixed contact 112 to a second fixed contact 111 when a magnetic coil 113 is energized, and which returns to the first contact 112 when the coil 113 is de-energized. The electric motor 2 rotates to drive the slide element 5 in the forward direction when electric current flows from the power supply 30 through a control switch 13 and through contacts 92, 90 to the motor. The motor rotates to drive the slide element 5 in reverse direction when electric current flows from the power supply 30, through the control switch 13 and the contacts 111, 110 to the motor. In this first embodiment, the control switch 13 is a transmission shift lever switch. The transmission shift lever switch 13 is open when the transmission shift lever 12 is in the reverse position, and closed when the transmission shift lever is in neutral or forward position, as shown in FIG. 3.

In operation, when the door is opened and the transmission shift lever 12 is in the neutral or forward position, switch 1 is closed to supply the relays 9 and 10 with electric current from the power supply 30. As a result, the transfer contact 90 of the relay 9 shifts from the fixed contact 91 to the fixed contact 92, and the relay 10, and therefore the normally closed contact 100, are opened. Electric current flows from the power supply 30, through the closed transmission switch 13, the contacts 92, 90 of the relay 9, the motor 2, the contacts 110, 112 of the relay 11 back to the power supply, thereby rotating the motor to move the slide element 5 forward, thereby closing the rear travel limit switch 8. When the slide element 5 then engages the front travel limit switch 7, this switch is opened and the relay 9 is de-energized. The moving contact 90 then returns to contact the fixed contact 91, thereby stopping the motor 2. In this position, the seat belt is in its full forward, or open, position, to permit a person to enter or exit the vehicle.

When the door is then closed and the transmission shift lever 12 is in the neutral or forward position, the door switch 1 is opened to de-energize the relay 10 so that the normally closed contact 100 closes. Electric current then flows from the power supply 30, through the contact 100 of the relay 10, the coil 113 of the relay 11 and the rear switch 8 to the power supply 30. Current also flows from the power supply, through the closed switch 13, the contacts 111, 110 of the relay 11, the motor 2, the contacts 90, 91 of the relay 9, and back to the power supply, with the result that the motor rotates in the reverse direction, thereby moving the slide element 5 backward to close the front travel limit switch 7. When the slide element 5 engages the rear travel limit switch 8, the switch opens, thereby stopping the motor. In this position, the seat belt is in its full rearward position, to retain an occupant in the vehicle seat.

When the transmission shift lever 12 is in the reverse position, the switch 13 is open, the motor 2 is not fed with electric current and remains stopped irrespective of whether the door is open. Thus, the slide element 5 which drives the retaining belt 4 is not moved while the vehicle is being backed. This protects the occupant's face and head from being struck by the slide element which would otherwise move automatically when the door opens. In this manner, the driver can open the door slightly, as when he is backing the vehicle, to improve his rearward vision by looking out through the door.

Figure 4:
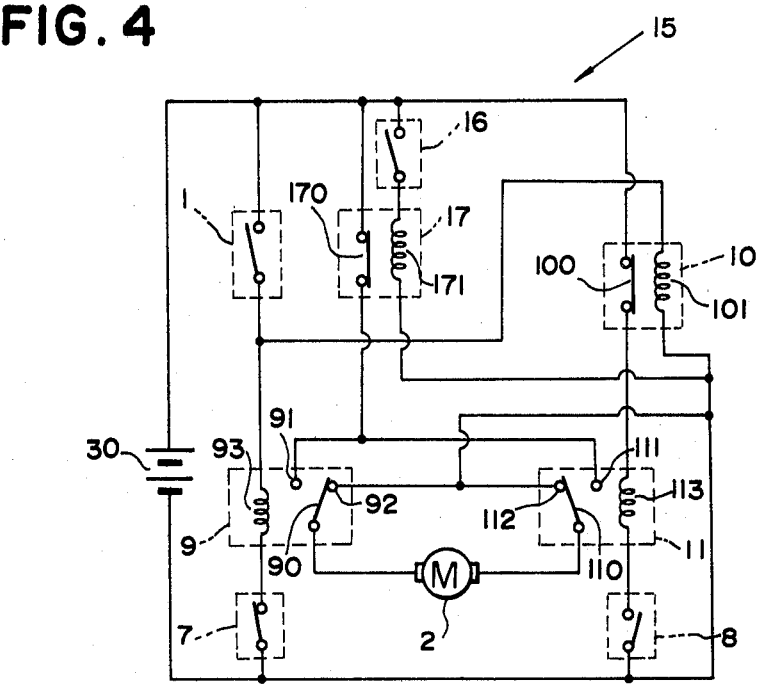
FIG. 4 is a schematic diagram of a second embodiment of the drive circuit.

Referring to FIG. 4, there is shown a second embodiment of the drive circuit, generally designated by the reference numeral 15. This circuit has the same structure as the FIG. 2 circuit except for inclusion of a backup lamp switch 16 and a relay 17 in place of the transmission shift lever switch 13. The backup lamp switch 16 is closed when the transmission shift lever 12 is in the reverse position, and is open when the lever is in the neutral or forward position. The relay 17 is normally closed, having a contact 170 which opens when a magnetic coil 171 is energized, and is closed when the coil is de-energized.

Thus, when the backup lamp switch 16 is closed, the relay contact 170 is opened and the electric power to the electric motor 2 is cut off. The motor thus remains stopped irrespective of whether or not the door is open, and therefore the slide element 5 does not move. As in the first embodiment, this measure prevents the slide element and seat belt from moving automatically when the driver opens the door slightly to improve his rearward vision while backing the vehicle.

Figure 5:
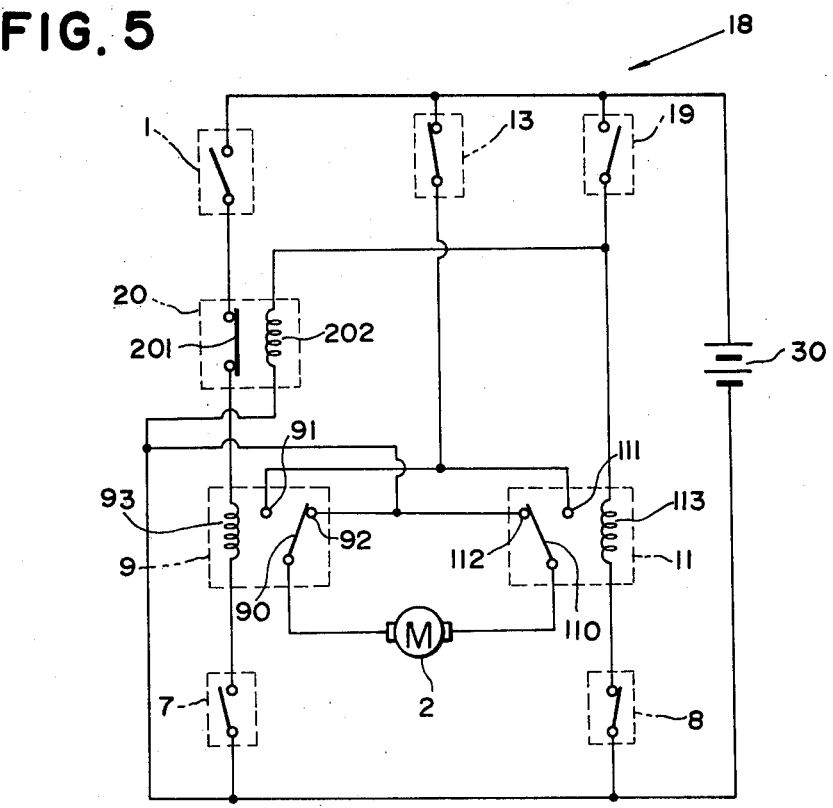
FIG. 5 is a schematic diagram of a third embodiment of the drive circuit.

Referring to FIG. 5, there is shown a third embodiment of the drive circuit, generally designated by the reference numeral 18. This circuit has the same structure as the FIG. 2 device except that the third embodiment further includes a switch 19 which is closed when the transmission shift lever 12 is in a forward position, for example the first position, and is open when the lever is in all other positions, as shown in FIG. 3. The FIG. 5 circuit includes a relay 20, having a normally closed contact 201, and a magnetic coil 202, which corresponds to the relay 10 shown in FIG. 2, and which is disposed in a different position from that of the relay 10.

When the transmission shift lever 12 is in any position other than the predetermined forward position and the reverse position, the switch 19 is open so that the relay 20 is not energized with the normally closed contact 201 remaining closed and the switch 13 is closed. Thus, when the door is opened and therefore the door switch 1 is closed, the relay 9 is energized and electric current flows through the motor 2 to drive the slide element 5 forward and slacken the seat belt. Furthermore, when the switch 19 is open, the relay 11 is not energized so that the circuit which drives the motor 2 to move the slide element 5 and the seat belt 4 backward is not formed. On the other hand, when the lever 12 is in the specified forward position, the switch 19 is closed, and the relay 20 is energized, thereby stopping the electric power to the motor 2. Thus, the slide element 5 does not automatically move when the door is opened or closed.

Figure 6:
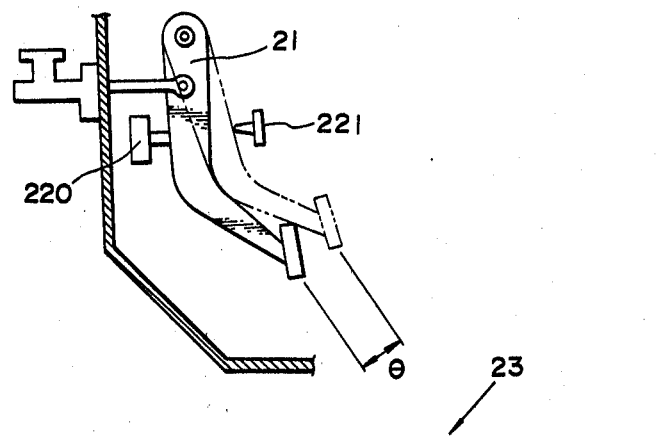
FIG. 6 is a side view of two switches, either of which is actuated by a clutch pedal, which switches may form part of the first or second embodiments of the drive circuit.

The FIG. 2 and FIG. 5 circuits may also include a switch 220 or 221 provided on either side of, and actuated by, the clutch pedal 21, as shown in FIG. 6, in place of the transmission shift lever switch 13, the switches 220 or 221 being opened and closed when the pedal 21 is depressed more than a predetermined angle and when the pedal is released. In this manner, the driver may easily deactivate the automatic seat belt mechanism by depressing the clutch the predetermined amount. Also, when the driver is driving either forward or backward at an extremely slow rate, as when backing or edging into a parking space, his depressing the clutch pedal in the normal course of parking or backing slowly will automatically deactivate the seat belt mechanism until the clutch pedal is again in its fully out position.

The FIG. 5 circuit may also include a backup lamp 16 switch and relay 17, as shown in FIG. 4, in place of the switch 13.

It is also possible to construct and arrange a circuit in which the slide element 5 is not driven even if the door is opened or closed during driving of the vehicle, using the circuit of a device which automatically locks the door according to a predetermined sensed vehicle speed.

Figure 7:
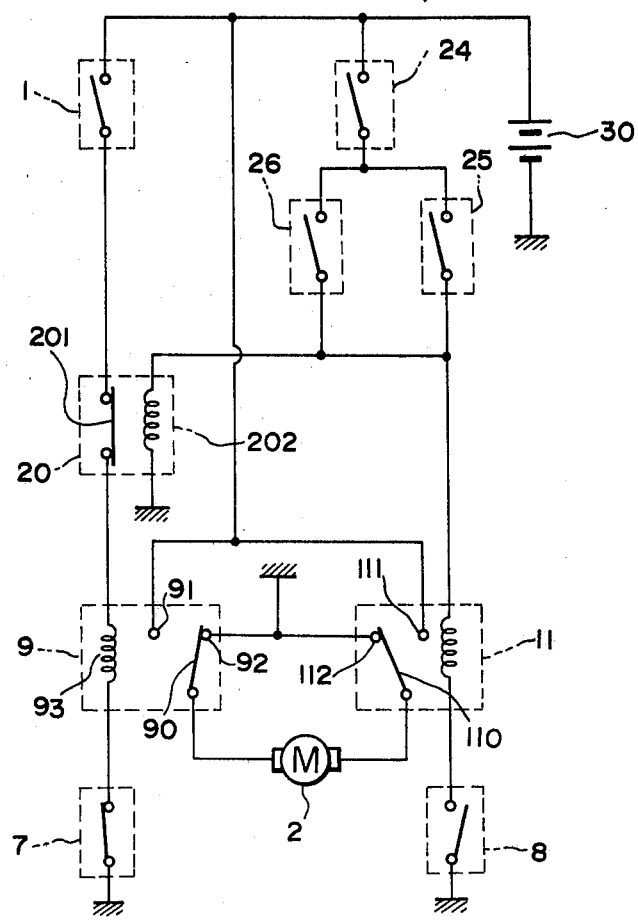
FIG. 7 is a schematic diagram of a fourth embodiment of the drive circuit.

Referring to FIG. 7, there is shown a fourth embodiment of the drive circuit, generally designated by the reference numeral 23. This embodiment is identical to the FIG. 5 circuit, except that the switch 13 is replaced with a direct connection and the transmission lever switch 19 is replaced by a group of switches 24, 25 and 26. The switch 24 is an ignition switch or transmission shift lever park position switch that opens when the ignition is turned off or the transmission shift lever is put in park position, respectively. The switches 25 and 26 are transmission shift lever switches connected in parallel to each other and each connected in series with the ignition switch 24. The switches 25 and 26 are closed when the transmission shift lever 12 is in the forward and reverse positions, respectively, and is opened when the lever is in the neutral position.

In operation, when the ignition or transmission shift lever park position switch 24 is open, i.e. when the vehicle is parked, or either of the transmission shift lever switches 25 or 26 is open, opening the door causes the door switch 1 to close to actuate the motor 2 to move the slide element 5 in the forward direction to release the seat belt from the occupant. When the slide element 5 engages the front travel limit switch 7 the switch 7 opens and stops the motor with the seat belt in the released position. The seat belt remains in this position, although the door is thereafter opened or closed, because with the front travel limit switch 7 open, the door switch does not affect the circuit operation.

When the front travel limit switch 7 is open, closing the ignition switch 24 and one of the lever switches 25 and 26 again causes the motor 2 to rotate to move the slide element 5 backward toward the rear travel limit switch 8. At the same time, the relay 20 opens to negate the effect of the closing of the front travel limit switch 7 when the slide element moves backward.

When the door is opened when the vehicle is parked and therefore the slide element 5 moves forward to engage the front travel limit switch 7, the slide element stops in the forward position to release the seat belt from around the occupant. As long as the transmission lever 12 is in park position, or the ignition is off, the slide element 5 will not move in response to opening or closing the door. When the ignition switch 24 and one of the transmission shift lever switches 25 and 26 are closed, the slide element 5 returns to the rear travel limit switch 8 so that the seat belt tightens the occupant against the seat.

Figure 8:
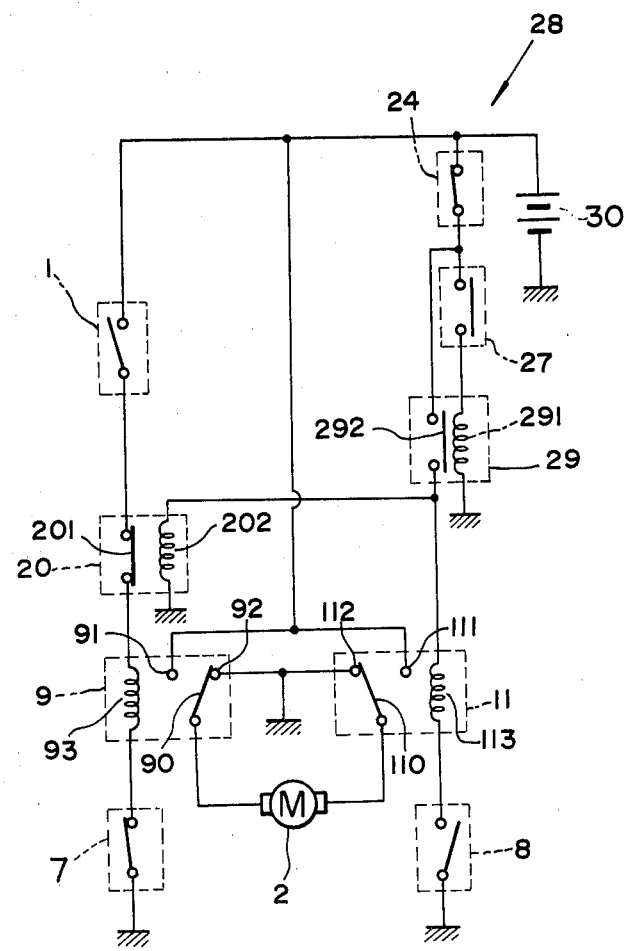
FIG. 8 is a schematic diagram of a fifth embodiment of the drive circuit.

Referring to FIG. 8, there is shown the fifth embodiment of the drive circuit, generally designated by 28. This circuit has the same structure as the FIG. 7 circuit, except that the FIG. 8 circuit uses a hand brake switch 27 which is closed when the vehicle is parked and a relay 29 connected in series with the ignition switch 24, in place of the transmission switches 25 and 26.

When the seat belt 4 is released, the FIG. 8 circuit operates in the same manner as the FIG. 7 circuit if the ignition switch 24 is open. When the ignition switch 24 is closed after the occupant is seated in the vehicle, when the hand brake switch 27 is opened (when the parking brake is released), the relay 11 is energized so that the motor 2 drives the slide element 5 in the reverse direction, thereby causing the seat belt 4 to secure the occupant against the seat. When the ignition switch 24 and the hand brake switch 27 are closed, the magnetic coil 291 of the relay 29 is energized so that a normally closed contact 292 is opened, thereby deactivating the relay 11, so that opening the door activates the relay 9 to operate the the seat belt release position and the slide element 5 remains there irrespective of the opening and closing movements of the door until the switch 24 and the relay 29 become on.

As is clear from the above, according to the present invention, since the slide element moves only when necessary, the occupant is protected from being struck in the face or on the head by the slide element which would otherwise move automatically when the door is opened. Additionally, the battery, as the driving source for the slide element drive circuit, is protected from useless discharge which would otherwise occur due to repeated unnecessary movement of the slide element.

Applicant has provided an automatic vehicle seat belt device of the present invention and several alternative embodiments thereof, all of which satisfy all of the aims and objectives set forth hereinabove. It should be understood that further modifications and variations may be made in the present invention without departing from the spirit of the present invention as set forth in the appended claims.

What is claimed is:

1. An automotive vehicle seat belt device, comprising:
   (a) a slide mechanism fixed to the vehicle, said mechanism comprising:
      (i) a slide rail; and
      (ii) a slide element slidably mounted to said rail;
   (b) a seat belt anchored at one end thereof to the vehicle and connected at the other end thereof to said slide element;
   (c) a drive motor operably connected to said slide element to move said slide element along said slide rail; and
   (d) an electric circuit for controlling the operation of said drive motor, comprising:
      (i) a front travel limit switch operative in response to the position of said slide element;
      (ii) a rear travel limit switch operative in response to the position of said slide element;
      (iii) a door switch operative in response to the door position;
      (iv) first changeover means responsive to a first position of said door switch and a switch for driving said motor in one direction to move said slide element to the front;
      (v) second changeover means responsive to a second position of said door switch and a first position of said rear travel limit switch for driving said motor in the reverse direction to move said slide element to the rear; and
      (vi) control switching means for disabling the effect of the movement of said door switch to its first position, said control switching means being actuated in response to predetermined vehicle conditions.

2. The seat belt device according to claim 1, wherein said control switching means is actuated by a transmission shift lever thereby to shut off the drive electric current flowing through said motor when said transmission shift lever is in reverse position.

3. The seat belt device according to claim 1, wherein said control switching means is actuated by a backup light to shut off the drive electric current flowing through said motor when the backup light is lighted.

4. The seat belt device according to claim 3, wherein said control switching means includes switching means closed in response to the lighting of the backup light and a normally closed switch opened in response to the closing of said switching means for disabling the motor.

5. The seat belt device according to claim 1, wherein said control switching means is actuated in response to the release of a clutch pedal, thereby disabling said motor.

6. The seat belt device according to claim 2 or 5, further including a second transmission shift lever switch actuated in response to the setting of the transmission shift lever to forward position for disabling the effect of the movement of the door switch.

7. The seat belt device according to claim 6, further including means responsive to the actuation of said second transmission shift lever switch for disabling said first changeover means.

8. The seat belt according device to claim 1, wherein said control switching means further includes an ignition switch, a pair of parallel connected transmission shift lever switches, one said shift lever switch being actuated when the transmission shift lever is in forward position and the other said shift lever being actuated when the transmission shift lever is in reverse position, and wherein said electric circuit first changeover means is responsive to said door switch and said front travel limit switch for driving said motor in the reverse direction, and wherein said electric circuit second transferring means is further responsive to said ignition switch and either of said transmission shift lever switches for driving said motor in the reverse direction.

9. The seat belt according device to claim 8, wherein said electric circuit further includes a normally closed switch opened when said ignition switch and either of said transmission shift lever switches are closed, thereby disabling the effect of said first transferring means.

10. The seat belt device according to claim 1, wherein said control switching means further includes an ignition switch, a hand brake switch, a first normally closed switch which is opened when said ignition switch and said hand brake switch are closed, and a second normally closed switch which is opened when said ignition switch is closed and said hand brake switch is open, whereby when said first normally closed switch is open, said second transferring means is disabled, and when said second normally closed switch is open, said first changeover means is disabled.

11. The seat belt device according to claim 1, 2, 3, 4, 5, 8, 9 or 10, wherein said slide mechanism is fixed to a door of said vehicle.

12. The seat belt device according to claim 1, 2, 3, 4, 5, 8, 9 or 10, wherein said slide mechanism is fixed to the roof of said vehicle.

13. The seat belt device according to claim 7, wherein said slide mechanism is fixed to a door of said vehicle.

14. The seat belt device according to claim 7, wherein said slide mechanism is fixed to the roof of said vehicle.

* * * * *